United States Patent [19]

Bryant et al.

[11] Patent Number: 5,155,494

[45] Date of Patent: * Oct. 13, 1992

[54] VEHICLE ANTENNA SYSTEM

[75] Inventors: Everette T. Bryant; Alex F. Wells; David M. Phemister, all of Vancouver, Wash.

[73] Assignee: Larsen Electronics, Inc., Vancouver, Wash.

[ * ] Notice: The portion of the term of this patent subsequent to Mar. 24, 2009 has been disclaimed.

[21] Appl. No.: 626,628

[22] Filed: Dec. 12, 1990

Related U.S. Application Data

[63] Continuation of Ser. No. 447,720, Dec. 8, 1989, Pat. No. 5,099,252.

[51] Int. Cl.⁵ .............................................. H01Q 1/32
[52] U.S. Cl. .................................. 343/713; 343/715
[58] Field of Search ............... 343/711, 713, 715, 720; 455/272, 292

[56] References Cited

U.S. PATENT DOCUMENTS

| | | | |
|---|---|---|---|
| 2,206,820 | 7/1940 | Mydlil | 343/745 |
| 2,559,613 | 7/1951 | Halstead | 343/720 |
| 2,829,367 | 4/1958 | Rychlik | 343/850 |
| 3,364,487 | 1/1968 | Maheux | 343/702 |
| 3,657,652 | 4/1972 | Smith | 343/720 |
| 4,001,834 | 1/1977 | Smith | 343/754 |
| 4,028,704 | 6/1977 | Blass | 343/715 |
| 4,089,817 | 5/1978 | Kirkendall | 343/713 |
| 4,238,799 | 12/1980 | Parfitt | 343/715 |
| 4,621,243 | 11/1986 | Harada | 343/715 |
| 4,658,259 | 4/1987 | Blaese | 343/715 |
| 4,692,770 | 9/1987 | Kadokura | 343/715 |
| 4,764,773 | 8/1988 | Larsen et al. | 343/713 |
| 4,779,098 | 10/1988 | Blaese | 343/715 |
| 4,794,319 | 12/1988 | Shimazaki | 343/711 |
| 4,804,969 | 2/1989 | Blaese | 343/715 |
| 4,825,217 | 4/1989 | Young | 343/715 |
| 4,839,660 | 6/1989 | Hadzoglou | 343/715 |
| 4,850,035 | 7/1989 | Schiller | 455/109 |
| 4,862,183 | 8/1989 | Blaese | 343/715 |
| 5,017,934 | 5/1991 | Blaese | 343/713 |
| 5,023,622 | 6/1991 | Blaese | 343/713 |

FOREIGN PATENT DOCUMENTS

| | | | |
|---|---|---|---|
| 3537107A1 | 10/1985 | Fed. Rep. of Germany | 343/715 |
| 1203227 | 8/1958 | France | 343/715 |
| 1227757 | 6/1959 | France | 343/715 |
| 1-36128 | 2/1989 | Japan | 343/711 |
| 1-77230 | 3/1989 | Japan | 343/711 |

OTHER PUBLICATIONS

AARL Handbook for Radio Amateurs, American Radio Relay League, 1991, Ed. 68, pp. 28-34.
Fink, Electronics Engineers' Handbook, McGraw-Hill Book Company, 1st Ed., 1975, p. 3—3.
Johnson, Transmission Lines and Networks, McGraw-Hill Book Company, 1950, p. 239.

Primary Examiner—Michael C. Wimer
Attorney, Agent, or Firm—Klarquist, Sparkman, Campbell, Leigh & Whinston

[57] ABSTRACT

A mobile antenna system features passive repeater operation to transfer energy between a radio transceiver located inside a vehicle and an external radiator mounted on the outside thereof. By this arrangement, a user of the radio transceiver can gain benefit from the external radiator without the hinderance of a physical, wired connection linking the transceiver to the antenna assembly. In a preferred embodiment, the antenna system operates without any electrical cable extending inside the vehicle from the external radiator.

9 Claims, 2 Drawing Sheets

VEHICLE ANTENNA SYSTEM

This is a continuation of application Ser. No. 07/447,720, filed Dec. 8, 1989, U.S. Pat. No. 5,099,252.

FIELD OF THE INVENTION

The present invention relates to the field of cellular telephony, and more particularly relates to mobile antennas used with cellular telephones.

BACKGROUND AND SUMMARY OF THE INVENTION

Cellular telephony has grown at an exponential rate in recent years. No longer are car phones the exclusive domain of the limousine set. Now they are becoming commonplace in all types of vehicles.

The associated technology has advanced at a dizzying pace as well. No longer are car phones heavy units bolted to the floors of vehicles. Rather, they are now small lightweight units which take a number of forms. So called "mobile" phones usually are permanently installed in a vehicle. These units must be connected to both the vehicle battery and to an external antenna (which is typically mounted on the windshield of the vehicle). "Portable" phones are adapted to be hand carried and include their own battery packs and antennas. A hybrid form of phone, termed a "transportable" can be connected to a vehicle's battery and external antenna, or it may be disconnected and removed from the vehicle, relying on an internal battery pack and its own antenna for operation.

In strong signal areas, all of these units perform well. In fringe areas, however, the associated antennas become more critical. To maintain good communications from a transportable phone at a fringe location, the unit must generally be connected to the vehicle-mounted antenna, rather than rely on its own. If a portable phone is used from a fringe location, it is best to operate the unit outside of the vehicle, with the phone's antenna in the clear. If either a portable or transportable is operated inside the passenger compartment of a vehicle using its built-in antenna, fringe area performance suffers, since the metal surrounding the passenger compartment interferes with transmission of the radio signals.

It will be recognized that it is tedious to connect and disconnect a transportable telephone to a vehicle antenna each time the phone is taken inside or outside a car. However, such action is necessitated in fringe areas. Similarly, it is troublesome for a user of a portable phone to stop the vehicle, get out, and position the portable's own antenna in the clear in order to maintain clear communications. However, this is the present state of the art.

The present invention overcomes these problems. It permits users of transportable and portable telephones to gain the benefit of a vehicle-mounted antenna without requiring that tedious connections be made or broken each time the telephone is moved into or out of a car. The invention even permits portable telephones which have no provision for connection to an external antenna to gain the benefit of an external, vehicle mounted antenna.

In accordance with the present invention, signals are coupled between a vehicle mounted antenna and a cellular telephone by radio rather than by wire. In one embodiment of the invention, this is achieved by providing an on-glass vehicle antenna with an auxiliary antenna inside the vehicle. Signals are passed to and from the external antenna portion of the on-glass antenna by transmission of signals between the telephone's own antenna and the internal auxiliary antenna portion of the on-glass antenna.

It will be recognized that the invention may be likened to so called "passive repeaters." Such repeaters are known in a number of fields, including relay stations to provide cellular telephone coverage in areas that would otherwise be inaccessible to radio signals, such as inside tunnels. In this application, a high gain antenna, typically a parabolic dish, is mounted outside of the tunnel and is directed towards the nearest cellular broadcasting station. This parabolic antenna is connected by coaxial cable or waveguide to one or more antennas inside the tunnel, thereby providing radio coverage inside the tunnel.

While passive repeaters are a well known technology, no one, to applicants' knowledge, has heretofore applied it to the problem of conveniently using portable and transportable telephones from within the passenger compartments of vehicles. Others skilled in this art failed to arrive at the present invention despite massive research and development efforts in the cellular telephony field by industry leaders in the U.S., Europe and Japan. The nonobviousness of the present invention is illustrated by the unanimity with which it has been overlooked.

The above-described features and advantages of the present invention will be more readily apparent from the following detailed description thereof, which proceeds with reference to the accompanying drawings.

DETAILED DESCRIPTION

To provide a comprehensive disclosure without unduly lengthening this specification, applicants incorporate by reference the disclosures of U.S. Pat. Nos. 4,862,183, 4,804,969, 4,794,319, 4,764,773 (Larsen), 4,658,259 (Blaese), 4,238,799 (Parfitt), 4,089,817, 4,028,704, 2,829,367 and 2,206,820.

As illustrated by the above-referenced patents, vehicle mounted antennas are typically coupled to the radio transceiver units with which they are used by one of two techniques: direct feed or through-the glass coupling (inductive or capacitive). In direct feed systems, there is an electrical connection from the feed line to the antenna. This connection is usually made by a cable that passes through a hole drilled in the vehicle body. Through-the-glass coupling is most commonly used for cellular vehicle antennas since no hole need be drilled in the vehicle.

Through-the-glass coupling systems usually take one of two forms. In the first, a low impedance presented by the transmission line (connecting to the telephone) is transformed up to match a high impedance presented by the external antenna. The Larsen and Parfitt patents illustrate this technique. In the Larsen system, the transformation up to the high impedance is performed on the side of the glass outside the vehicle; the through-the-glass coupling is performed at a low impedance. In the Parfitt system, the transformation up to the high impedance is performed on the side of the glass inside the vehicle; the through-the-glass coupling is performed at a high impedance.

In the second type of through-the-glass coupling, a low impedance presented by the transmission line is coupled directly to a low impedance antenna without any impedance transformation. The Blaese patent illustrates this technique.

The present invention is applicable to all of these through-the-glass techniques, as well as to traditional direct feed techniques. For expository convenience, the invention will be illustrated with reference to the Larsen system.

Figure 1:
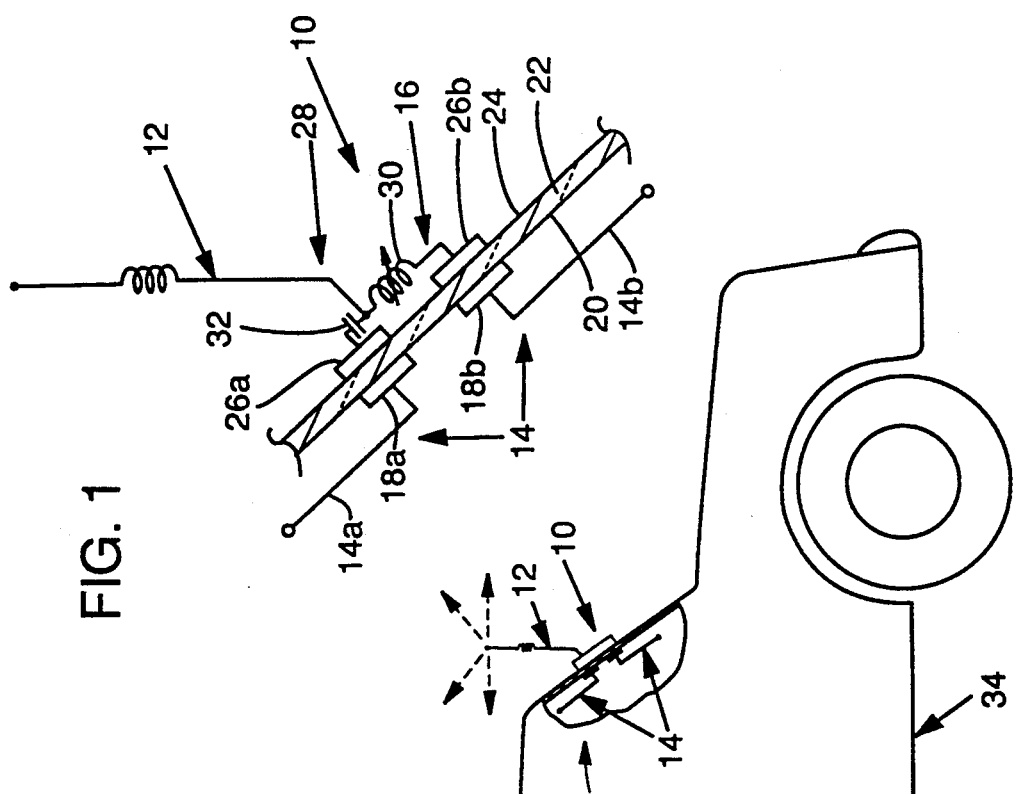
FIG. 1 is a schematic illustration of an antenna system according to one embodiment of the present invention.

Referring to FIG. 1, an antenna system 10 according to the present invention includes an external radiator 12, an internal auxiliary antenna 14, and some means 16 for coupling energy therebetween. In the illustrated embodiment, the internal auxiliary antenna comprises a dipole dimensioned to present a low resonant impedance in the cellular telephone frequency band. Each leg 14a, 14b of the dipole is connected to an inside capacitive coupling plate 18a, 18b. These inside capacitive coupling plates, in turn, are mounted to an inside surface 20 of a vehicle windshield 22.

On an outside surface 24 of the vehicle windshield 22, opposite the inside coupling plates 18a, 18b, are mounted corresponding outside capacitive coupling plates 26a, 26b. These plates, in turn, are connected to an impedance transformation network 28, which here comprises a series-coupled inductor 30 and capacitor 32. The inductor 30 is tuned to match a high resonant impedance presented by the external radiator 12 to the low impedance coupled through the vehicle windshield from the low impedance internal auxiliary antenna 14.

Figure 2:
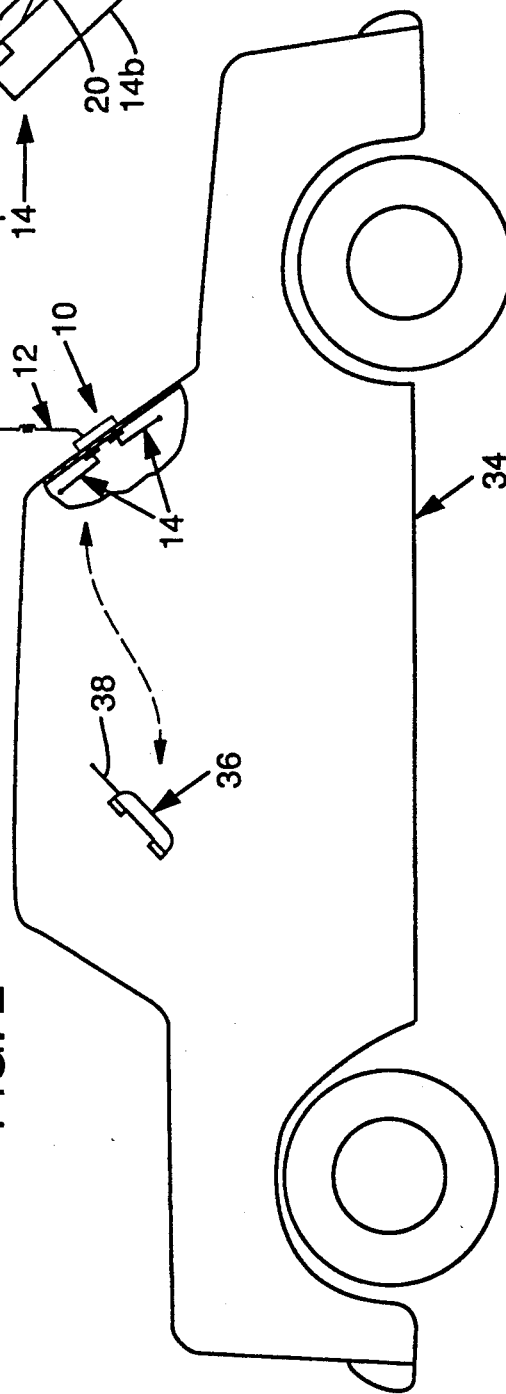
FIG. 2 is a schematic illustration of the antenna system of FIG. 1 used in the passenger compartment of a vehicle in conjunction with a portable cellular telephone.

Referring now to FIG. 2, the antenna 10 of the present invention is shown mounted on the rear windshield of a vehicle 34. Inside the passenger compartment of the vehicle is a portable or transportable telephone 36 with its own antenna 38. Signals broadcast from the telephone antenna 38 are picked up by the internal auxiliary antenna 14 and rebroadcast outside the passenger compartment using the external radiator 12. Similarly, signals received by the external radiator 12 are rebroadcast inside the vehicle by the antenna 14 and received by the telephone antenna 38.

The internal auxiliary antenna may be oriented to achieve vertical or horizontal polarization. Surprisingly, best results are often achieved with horizontal polarization, despite the fact that the telephone antenna with which it is communicating is generally vertically polarized.

Figure 3:
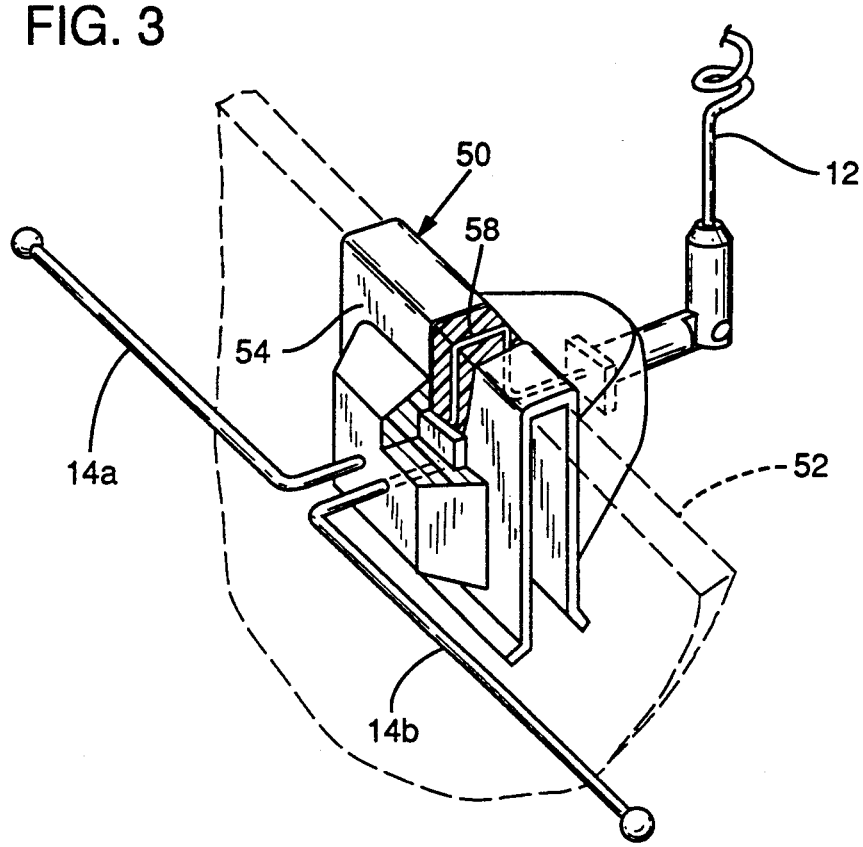
FIG. 3 is an illustration of an antenna system according to a second embodiment of the present invention.
Figure 4:
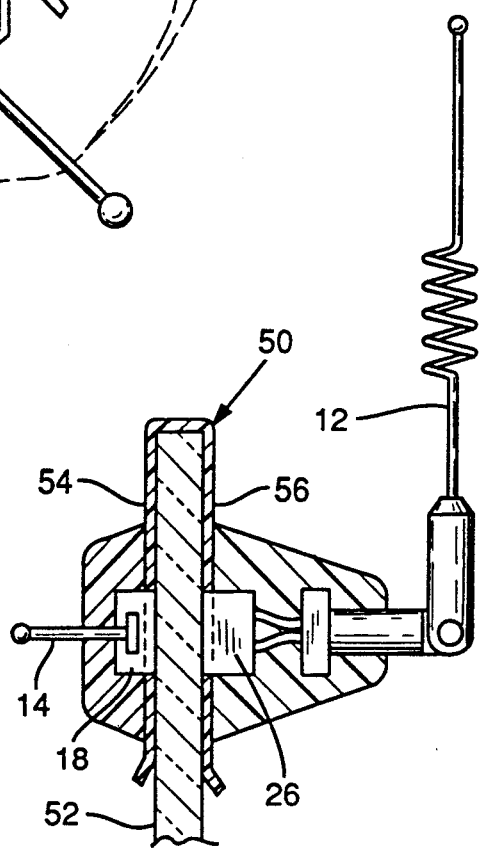
FIG. 4 is an illustration of an antenna system according to a third embodiment of the present invention.

In another embodiment of the invention, (FIGS. 3 and 4), the antenna system may be adapted for removable mounting on the top of a vehicle window. A spring-plastic U-shaped clip 50 can slide down over the top edge of a partially-rolled down window 52. The internal auxiliary antenna can be mounted to the inside portion 54 of the clip. The external radiator can be mounted to the outside portion 56 of the clip. Coupling from the internal antenna to the external radiator can be accomplished by a transmission line 58 molded into the plastic clip that connects the two (FIG. 3). Alternatively, a capacitive or inductive coupling arrangement can be used, with one coupling component 26 attached to the outside portion of the clip and the other coupling component 18 attached to the inside portion of the clip (FIG. 4).

It will be recognized that in either of the two foregoing arrangements (i.e. coupling from the internal antenna to the external radiator by a transmission line, or coupling through cooperating components mounted on opposite sides of the glass), no powered circuitry is involved. In other words, the coupling is passive.

If desired, a vehicle may be provided with two or more antenna systems according to the present invention. By using a plurality of such antenna systems, a directional radiation pattern is achieved. Unlike most phased arrays, the directional characteristics here are dependent not only on the spacings of the radiators relative to each other, but also on the location of the portable or transportable telephone's antenna within the array of internal antennas. By moving the telephone within the car, the relative phasings of the signals driving the radiators are altered, changing the net radiation pattern. Thus, by use of a plurality of antenna systems according to the present invention, it is possible to provide a steerable phased array—steerable simply by moving the telephone inside the vehicle.

CONCLUSION

It will be recognized that the foregoing embodiments permit transportable phones to gain the benefit of an external vehicle-mounted antenna without having to connect or disconnect the antenna each time the telephone is moved to or from the vehicle. The invention similarly permits portable phones, which often cannot connect to an external antenna even by cable, to easily utilize an external antenna.

Having described and illustrated the principles of our invention with reference to several embodiments thereof, it will be apparent that the invention can be modified in arrangement and detail without departing from such principles. For example, while the invention has been illustrated with reference to an embodiment in which the internal auxiliary antenna is a dipole and presents a low impedance, in other embodiments other interior antenna configurations may be used, some of which present high impedances. Similarly, while the invention has been illustrated with reference to an embodiment in which an inductor/capacitor matching network is used outside the glass, a variety of other matching arrangements may be used on either side of the glass, or no matching network at all may be required. Of course, the invention may also be applied to direct feed antennas by directly connecting the internal auxiliary antenna to the external radiator, as was noted in connection with the second embodiment. Similarly, if a vehicle is provided with a direct feed radiator mounted on the vehicle trunk, an auxiliary antenna may be positioned within the passenger compartment of the vehicle and connected to the external radiator by cabling.

In view of the variety of embodiments to which the principles of our invention may be applied, it should be recognized that the detailed embodiments are illustrative only and should not be taken as limiting the scope of our invention. Instead, we claim as our invention all such embodiments as may come within the scope and spirit of the following claims and equivalents thereto.

We claim:

1. A method of operating a radio transceiver inside the passenger compartment of a vehicle, the radio transceiver transmitting and receiving signals in a frequency band, the vehicle including a windshield, the method comprising the steps:

when transmitting:
broadcasting a first signal from the transceiver inside the passenger compartment using an antenna connected to the radio transceiver;
receiving the first signal using an internal auxiliary antenna mounted on an inside surface of the windshield but not connected to the radio transceiver, said internal auxiliary antenna being resonant in the frequency band;
coupling the first signal from the internal auxiliary antenna through the windshield and to an external radiator without an electrical cable extending between the internal antenna and the external radiator, the external radiator being mounted on an outside surface of the windshield, the external radiator being resonant in the frequency band; and
reradiating the first signal from the external radiator; and when receiving:
receiving a second signal using the external radiator;
coupling the second signal from the external radiator through the windshield and to the internal antenna without an electrical cable extending between the external radiator and the internal antenna;
reradiating the second signal inside the passenger compartment using the internal auxiliary antenna; and
receiving the reradiated second signal using the antenna connected to the radio transceiver.

2. The method of claim 1 in which the coupling steps each includes capacitively coupling a signal between the internal auxiliary antenna and the external radiator and through the windshield without an electrical cable extending therebetween.

3. A method of operating a cellular telephone inside the passenger compartment of a vehicle, the cellular telephone transmitting signals to and receiving signals from a cellular system, the method comprising the steps:

when transmitting:
broadcasting a first signal from the telephone inside the passenger compartment using an antenna connected to the cellular telephone;
receiving the first signal using an internal auxiliary antenna located inside the passenger compartment but not connected to the cellular telephone, the internal antenna being tuned for resonance in the cellular telephone frequency band;
coupling the first signal from the internal auxiliary antenna and to an external radiator through an insulating material extending therebetween and without an electrical cable extending between the external radiator and the internal auxiliary antenna, the external radiator being tuned for resonance in the cellular telephone frequency band; and
reradiating the first signal from the external radiator to the cellular system; and when receiving:
receiving a second signal from the cellular system using the external radiator;
coupling the second signal from the external radiator and to the internal auxiliary antenna through the insulating material extending therebetween and without an electrical cable extending between the external radiator and the internal auxiliary antenna;
reradiating the second signal inside the passenger compartment using the internal auxiliary antenna; and
receiving the reradiated second signal using the antenna connected to the cellular telephone.

4. A vehicle mounted antenna system for use with a cellular telephone comprising:
an external radiator tuned for operation in the cellular telephone frequency band for mounting on the exterior of a vehicle;
means adapted for mounting the radiator on a first surface of an insulating glass window associated with the exterior of the vehicle; and
an internal auxiliary antenna for mounting in a passenger compartment of the vehicle, said internal auxiliary antenna being coupled to the external radiator through the insulating glass window without an electrical cable extending therebetween;
wherein no wired connection links the antenna system with the cellular telephone with which it is used.

5. The antenna system of claim 4 in which the external radiator is oriented vertically and the internal auxiliary antenna is oriented horizontally.

6. An antenna assembly adapted for mounting on a glass surface of a motor vehicle and adapted for use with a portable cellular telephone, characterized by:
an external radiator positioned outside the vehicle and resonant in the cellular telephone frequency band;
an auxiliary radiator coupled with the external radiator;
the absence of a feedline coupling said antenna assembly with the portable cellular telephone with which it is to be used; and
the absence of a feedline coupling the external radiator to the auxiliary radiator;
wherein a user of the portable cellular telephone can gain benefit from the external radiator without the hindrance of a physical, wired connection between the telephone and the antenna assembly.

7. In a method of transmitting cellular telephone signals using a portable cellular telephone and a vehicle mounted antenna assembly, the portable cellular telephone being positioned inside a vehicle, the vehicle mounted antenna assembly including an external radiator that is positioned outside the vehicle and is mounted on an exterior glass surface thereof, the method including coupling cellular telephone signals to the external radiator from the portable cellular telephone, an improvement comprising:
coupling the cellular telephone signals to the antenna assembly from the portable cellular telephone through an auxiliary antenna coupled to the external radiator, without an electrical cable extending between the portable cellular telephone and the antenna assembly, and without an electrical cable extending from the external radiator to inside the vehicle, wherein a user of the portable cellular telephone can gain benefit from the antenna assembly without the hindrance of a physical, wired connection between the telephone and the antenna assembly, and wherein no wired connection needs to be established from the external radiator to inside the vehicle.

8. The method of claim 7 which further includes:

providing an internal auxiliary antenna, said internal auxiliary antenna being resonant in the cellular telephone frequency band;

positioning the internal auxiliary antenna inside the vehicle;

coupling cellular telephone signals to the internal auxiliary antenna from an antenna of the cellular telephone without an electrical cable extending between the cellular telephone and the internal auxiliary antenna; and coupling cellular telephone signals to the external radiator from the internal auxiliary antenna without an electrical cable extending therebetween.

9. The method of claim 8 in which the coupling of cellular telephone signals to the external radiator from the internal auxiliary antenna is effected by capacitive coupling.

* * * * *